United States Patent [19]
Clerici et al.

[11] Patent Number: 4,718,176
[45] Date of Patent: Jan. 12, 1988

[54] METHOD AND PLANT FOR THE MANUFACTURE OF DRY-CHARGED STORAGE BATTERIES

[75] Inventors: Guido Clerici, Milan; Luciano Lemorini, Magenta, both of Italy

[73] Assignee: Magneti Marelli S.p.A., Milan, Italy

[21] Appl. No.: 866,435

[22] Filed: May 23, 1986

[30] Foreign Application Priority Data

May 23, 1985 [IT] Italy ............................... 67475 A/85

[51] Int. Cl.$^4$ ............................................... F26B 3/34
[52] U.S. Cl. ......................................... 34/1; 29/623.1; 429/120; 204/2.1
[58] Field of Search ............... 34/1, 68, 240, 241, 34/105, 231, 95, 201–203, 212; 29/623.1; 204/2.1; 429/120

[56] References Cited

U.S. PATENT DOCUMENTS

| | | | |
|---|---|---|---|
| 2,421,690 | 6/1947 | Ensor et al. | 34/236 X |
| 2,831,669 | 4/1958 | Stamps | 34/68 X |
| 3,556,852 | 1/1971 | Haebler et al. | 204/2.1 |
| 4,189,849 | 2/1980 | Schoot | 34/236 X |
| 4,513,513 | 4/1985 | Sayles | 34/68 X |

*Primary Examiner*—Anthony Skapars
*Attorney, Agent, or Firm*—Sughrue, Mion, Zinn, Macpeak and Seas

[57] ABSTRACT

The method enables the manufacture of dry-charged batteries, the plates whereof are constituted by pasted grids, intercalated with separators and assembled in an insulating container closed by a lid provided with gas vents. The pasted grids and the separators are assembled in the container before the forming process, and the plates are subjected to the forming process and to subsequent washing in the container itself. The completed battery, fitted with its lid, is then dried by microwave heating in an environment containing a hot inert gas.

4 Claims, 1 Drawing Figure

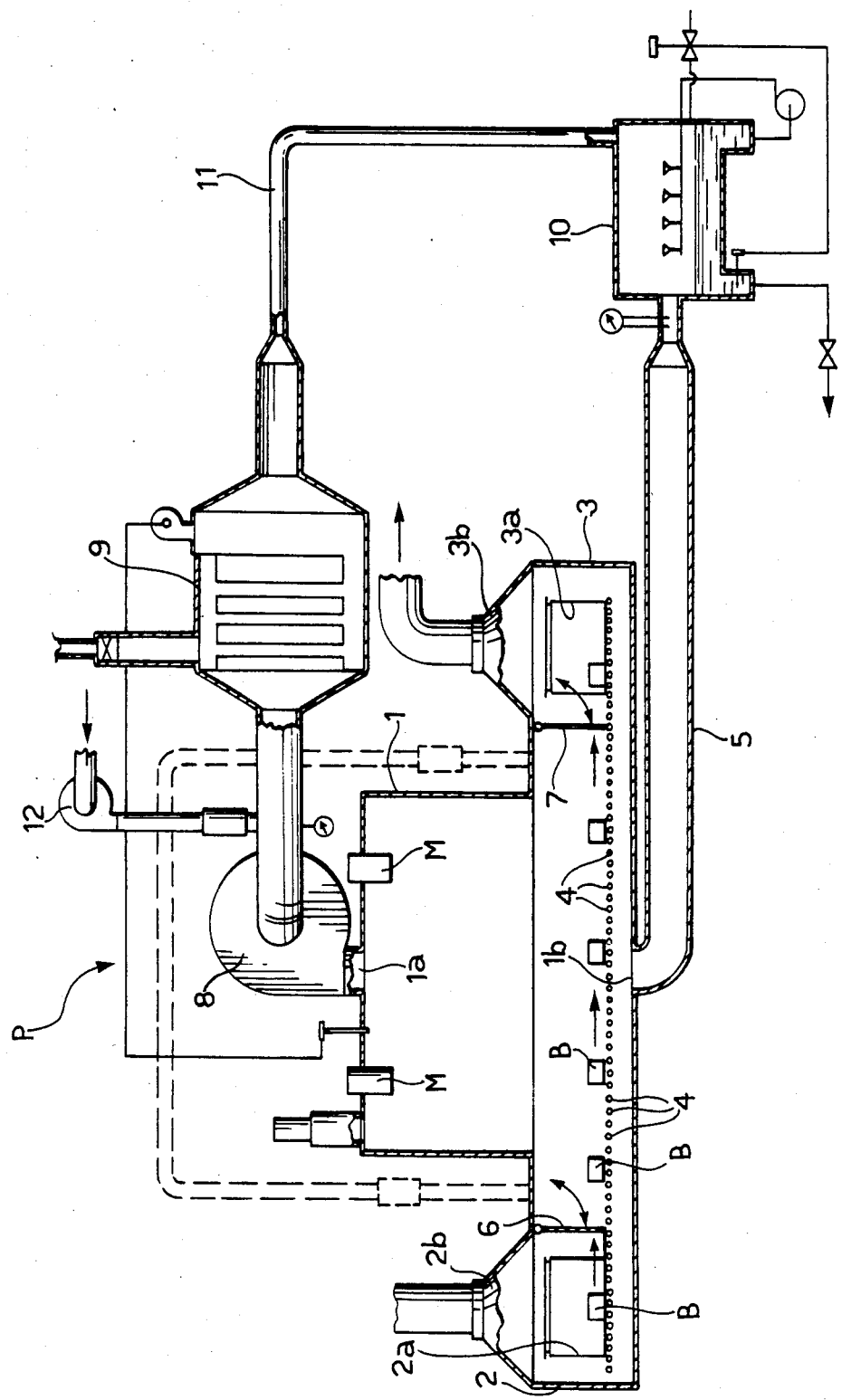

METHOD AND PLANT FOR THE MANUFACTURE OF DRY-CHARGED STORAGE BATTERIES

BACKGROUND OF THE INVENTION

The present invention relates to a method for the manufacture of storage batteries and particularly dry-charged, lead-acid batteries, the plates whereof are constituted by pasted grids intercalated with separators and assembled in an insulating container closed by a lid provided with gas vents.

So-called "dry-charged" batteries are free from electrolyte. Such batteries must be filled with electrolyte only at the time of activation.

The most important characteristic of dry-charged batteries is that they enable sales networks to keep them in stock for long periods of time without considerable self-discharge or deterioration of the electrodes occurring.

In order to make dry-charged batteries in accordance with the prior art, the plates are pasted, subjected to the forming operation and then washed and finally dried individually in an oven before assembly in the container constituted the battery box.

known techniques which enable the electrodes to be generated within the battery container itself have not until now been usable for the manufacture of dry-charged batteries since there has been no satisfactory solution to the problem of drying the battery after the washing which follows the formation of the electrodes.

SUMMARY OF THE INVENTION

In order to solve this problem the present invention proposes a method for the manufacture of batteries of the type specified above which is characterised in that the pasted grids and the separators are assembled in the container before the forming operation, the plates are subjected to the forming operation and to subsequent washing within the container, and the completed battery, fitted with its lid, is then dried by microwave heating in an environment containing a hot inert gas.

The invention also relates to a plant which can be used to carry out the said method.

Further characteristics and advantages of the invention will become apparent from the detailed description which follows, given with reference to the appended drawing, provided purely by way of non-limiting example, in which a plant according to the invention is illustrated schematically in partial section.

In the method according to the invention for the manufacture of dry-charged batteries, the pasted grids and the separators are mounted in the battery container before the forming process and the plates are then subjected to the forming process and to the subsequent washing within the container itself. This method, although being novel as regards the manufacture of dry-charged batteries, is a technique which has by now become consolidated in the manufacture of acid filled batteries, that is for batteries which are manufactured complete with electrolyte. Hence, these operations, which are now known, will be omitted from the present description.

DETAILED DESCRIPTION OF THE DRAWINGS

The FIGURE is a schematic diagram of the battery drying apparatus.

DETAILED DESCRIPTION OF THE PREFERRED EMBODIMENTS

The batteries shown schematically in the appended drawing and indicated by B are complete, that is, have electrodes which have already been subjected, to the forming operation and washing, with separators and a lid. These batteries are passed into a drying plant illustrated by way of example in the drawing and generally indicated P. This plant includes a drying chamber 1 communicating at opposite ends with an inlet chamber 2 and an outlet chamber 3. These have respective apertures or openings 2a, 3a, respectively for the inlet and outlet of the batteries B.

Rollers 4 of a conveyor device extend horizontally from the inlet chamber to the outlet chamber, passing through the drying chamber 1.

The batteries B to be dehydrated are passed on the rollers 4 through the aperture 2a of the inlet chamber and are conveyed through the drying chamber 1 towards the outlet chamber 3.

Within the vault of the drying chamber 1 are installed power microwave generators M, constituted by magnetrons, for irradiating the underlying region through which the batteries B are passed.

A flow of inert gas is sustained in the drying chamber, the gas being introduced into the chamber through an aperture 1a formed in the vault and evacuated through an aperture 1b formed in the bottom and through an outlet duct 5.

Two pivoted doors 6 and 7 are located between the drying chamber 1 and the inlet and outlet chambers tend to confine the inert gas to the drying chamber or at least limit its dispersion to the inlet and outlet chambers. These latter are surmounted by respective hoods 2b, 3b for evacuating inert gas which reaches these chambers.

The inert gas is preferably a combustion gas or mixture of combustion gases or "exogas".

In use, when the batteries B reach the drying chamber they are heated by the microwave field generated by the magnetrons M and their water content is reduced progressively. The dehydrating action of the microwave field is supplemented by the action of the inert gas which is made to flow through the chamber 1 by means of a circulating fan 8 after its own heating in a heat exchanger 9.

Since the batteries B are constituted by metal parts and insulating parts impregnated with water, the dehydration by the microwave field must be arrested while there is still a small amount of water (a few percent) in the batteries so as to avoid electrical discharges in the form of sparks and arcs which would tend to destroy the insulating parts. The drying is completed by the action of the inert gases which are preferably driven in convection currents to facilitate the removal of water vapour from the batteries through the gas vents in the lids.

The treatment times and temperatures of the batteries in the drying chamber should be chosen to take into account the fact that the temperature must not exceed limits derived from the possibility of fusion of the electrode material or of the separator diaphragms and, moreover, must not cause damage to or deformation of the containers. The treatment times and temperatures must, moreover, be minimized for reasons of productivity and reduction in energy consumption, and to avoid passivation of the cathode interface of the batteries.

The inert gas evacuated through the outlet duct 5 is fed to condensation apparatus 10 which removes the water vapour and is then returned to the heat exchanger 9 through a tube 11 and then passed back into circulation.

A pump 12 is connected to an exogas generator (not illustrated) and is arranged to deliver such a quantity of exogas into the plant as to replace the exogas evacuated through the hoods 2b and 3b of the inlet and outlet chambers and quantities of exogas dispersed in other ways.

As the batteries reach the outlet chamber 3 they are removed (in a manner not illustrated) and may be sent directly for storing.

I claim:

1. A plant for drying storage batteries comprising
   a drying chamber having an inlet and an outlet;
   generator means for generating a power microwave field in the chamber;
   means for causing a flow of hot inert gas in the drying chamber;
   conveyor means for conveying batteries from the inlet to the outlet of the chamber within the field generated by the generator means and through the inert gas flow;
   means for heating said inert gas before it is passed into the drying chamber,
   condenser means connected between said drying chamber and said inlet to the heater means for removing at least some of the water vapour from the inert gas evacuated from the drying chamber, and
   recirculation means for recirculating the inert gas in the drying chamber.

2. A plant according to claim 1, wherein said microwave generator means comprise at least one magnetron.

3. A plant according to claim 1, further comprising:
   an inlet chamber in communication with said drying chamber; and
   an outlet chamber in communication with said drying chamber,
   wherein said conveyor means include a roller conveyor which extends from said inlet chambers to said outlet chamber through said drying chamber.

4. A plant according to claim 3 further comprising:
   pivoted doors provided between said drying chamber and said inlet chamber and between said drying chamber and said oulet chamber for limiting the dispersion of the inert gas flowing in the drying chamber.

* * * * *